United States Patent
Kuwabara et al.

(10) Patent No.: US 10,705,617 B2
(45) Date of Patent: *Jul. 7, 2020

(54) TACTILE SENSATION PROVIDING APPARATUS AND CONTROL METHOD FOR TACTILE SENSATION PROVIDING APPARATUS

(71) Applicant: KYOCERA Corporation, Kyoto (JP)

(72) Inventors: Megumi Kuwabara, Kawasaki (JP); Kenji Kono, Yokohama (JP); Tomotake Aono, Yokohama (JP); Jun Takeda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/239,203

(22) Filed: Jan. 3, 2019

(65) Prior Publication Data

US 2019/0179415 A1 Jun. 13, 2019

Related U.S. Application Data

(63) Continuation of application No. 13/392,855, filed as application No. PCT/JP2010/005186 on Aug. 23, 2010, now Pat. No. 10,191,547.

(30) Foreign Application Priority Data

Aug. 27, 2009 (JP) ................................ 2009-197444
Jun. 30, 2010 (JP) ................................ 2010-149063

(51) Int. Cl.
*G06F 3/01* (2006.01)
*G06F 3/041* (2006.01)

(52) U.S. Cl.
CPC .............. *G06F 3/016* (2013.01); *G06F 3/041* (2013.01); *G06F 2203/04105* (2013.01)

(58) Field of Classification Search
CPC ............... G06F 3/016; G06F 2203/014; G06F 2203/04105; G06F 3/041
See application file for complete search history.

(56) References Cited

U.S. PATENT DOCUMENTS 5,854,625 A 12/1998 Frisch et al.
6,429,846 B2 8/2002 Rosenberg et al.
(Continued)

FOREIGN PATENT DOCUMENTS

CN 1392977 A 1/2003
CN 1845043 A 10/2006
(Continued)

OTHER PUBLICATIONS

Communication pursuant to Article 94(3) EPC issued by the European Patent Office dated Jun. 29, 2015, which corresponds to European Patent Application No. 10811493.5-1954 and is related to U.S. Appl. No. 13/392,855.
(Continued)

*Primary Examiner* — Michael J Jansen, II
(74) *Attorney, Agent, or Firm* — Studebaker & Brackett PC

(57) ABSTRACT

A tactile sensation providing apparatus includes a touch sensor configured to detect a touch input, a load detection unit configured to detect a pressure load on a touch face of the touch sensor, a tactile sensation providing unit configured to vibrate the touch face, and a control unit configured to adjust a drive signal of the tactile sensation providing unit based on a pushed position when the pressure load detected by the load detection unit satisfies a standard to provide a tactile sensation.

20 Claims, 14 Drawing Sheets

(56) References Cited

U.S. PATENT DOCUMENTS

| | | | |
|---|---|---|---|
| 6,822,635 B2 | 11/2004 | Shahoian et al. | |
| 7,113,177 B2 | 9/2006 | Franzen | |
| 7,215,329 B2 | 5/2007 | Yoshikawa et al. | |
| 7,292,227 B2 | 11/2007 | Fukumoto et al. | |
| 7,336,260 B2 | 2/2008 | Martin et al. | |
| 7,352,356 B2 | 4/2008 | Roberts et al. | |
| 7,382,357 B2 | 6/2008 | Panotopoulos et al. | |
| 7,400,319 B2 | 7/2008 | Nakayama et al. | |
| 7,593,000 B1 | 9/2009 | Chin | |
| 7,667,692 B2 | 2/2010 | Marcus et al. | |
| 7,808,488 B2 | 10/2010 | Martin et al. | |
| 7,869,589 B2 * | 1/2011 | Tuovinen | B06B 1/0215 379/433.07 |
| 7,944,435 B2 | 5/2011 | Rosenberg et al. | |
| 8,004,501 B2 | 8/2011 | Harrison | |
| 8,174,372 B2 | 5/2012 | da Costa | |
| 8,179,378 B2 | 5/2012 | Aono | |
| 8,232,969 B2 | 7/2012 | Grant et al. | |
| 8,264,465 B2 | 9/2012 | Grant et al. | |
| 8,325,144 B1 | 12/2012 | Tierling et al. | |
| 8,330,737 B2 | 12/2012 | Aono et al. | |
| 8,339,250 B2 | 12/2012 | Je et al. | |
| 8,345,013 B2 | 1/2013 | Heubel et al. | |
| 8,405,618 B2 | 3/2013 | Colgate et al. | |
| 8,436,839 B2 * | 5/2013 | Takashima | G06F 3/016 345/184 |
| 8,508,487 B2 | 8/2013 | Schwesig et al. | |
| 8,525,778 B2 | 9/2013 | Colgate et al. | |
| 8,624,859 B2 * | 1/2014 | Aono | G06F 3/0414 178/18.03 |
| 8,686,952 B2 | 4/2014 | Burrough et al. | |
| 8,780,053 B2 | 7/2014 | Colgate et al. | |
| 8,791,902 B2 | 7/2014 | Colgate et al. | |
| 8,816,969 B2 | 8/2014 | Aono et al. | |
| 8,830,187 B2 | 9/2014 | Aono | |
| 8,836,664 B2 | 9/2014 | Colgate et al. | |
| 8,937,599 B2 * | 1/2015 | Aono | G06F 3/016 178/18.06 |
| 9,116,569 B2 * | 8/2015 | Stacy | G06F 3/0414 |
| 9,122,325 B2 | 9/2015 | Peshkin et al. | |
| 9,164,584 B2 | 10/2015 | Mui et al. | |
| 9,235,265 B2 | 1/2016 | Karamath et al. | |
| 9,448,649 B2 * | 9/2016 | Aono | G06F 3/016 |
| 9,619,026 B2 | 4/2017 | Aono | |
| 9,696,803 B2 | 7/2017 | Cruz-Hernandez et al. | |
| 9,823,833 B2 | 11/2017 | Grant et al. | |
| 9,874,935 B2 | 1/2018 | Cruz-Hernandez et al. | |
| 9,891,708 B2 | 2/2018 | Cruz-Hernandez et al. | |
| 9,904,363 B2 | 2/2018 | Aono et al. | |
| 9,927,873 B2 | 3/2018 | Cruz-Hernandez et al. | |
| 10,007,340 B2 | 6/2018 | Cruz-Hernandez et al. | |
| 10,191,547 B2 * | 1/2019 | Kuwabara | G06F 3/016 |
| 10,386,925 B2 * | 8/2019 | Inoue | |
| 10,401,961 B2 * | 9/2019 | Cruz-Hernandez | |
| 2001/0035854 A1 | 11/2001 | Rosenberg et al. | |
| 2002/0033795 A1 | 3/2002 | Shahoian et al. | |
| 2002/0149561 A1 | 10/2002 | Fukumoto et al. | |
| 2003/0067449 A1 | 4/2003 | Yoshikawa et al. | |
| 2003/0117371 A1 | 6/2003 | Roberts et al. | |
| 2003/0122779 A1 | 7/2003 | Martin et al. | |
| 2003/0179190 A1 | 9/2003 | Franzen | |
| 2005/0054390 A1 * | 3/2005 | Tuovinen | B06B 1/0215 455/575.1 |
| 2005/0174336 A1 | 8/2005 | Nakayama et al. | |
| 2006/0052143 A9 * | 3/2006 | Tuovinen | B06B 1/0215 455/575.1 |
| 2006/0109256 A1 | 5/2006 | Grant et al. | |
| 2006/0119586 A1 | 6/2006 | Grant et al. | |
| 2006/0238510 A1 | 10/2006 | Panotopoulos et al. | |
| 2006/0274036 A1 | 12/2006 | Hioki et al. | |
| 2007/0013677 A1 | 1/2007 | Rosenberg et al. | |
| 2007/0146348 A1 | 6/2007 | Villain | |
| 2007/0229455 A1 | 10/2007 | Martin et al. | |
| 2007/0236450 A1 | 10/2007 | Colgate et al. | |
| 2008/0150911 A1 | 6/2008 | Harrison | |
| 2008/0202824 A1 * | 8/2008 | Philipp | G06F 3/02 178/18.01 |
| 2008/0296072 A1 * | 12/2008 | Takashima | G06F 3/016 178/18.01 |
| 2008/0303782 A1 | 12/2008 | Grant et al. | |
| 2008/0303799 A1 | 12/2008 | Schwesig et al. | |
| 2009/0002328 A1 | 1/2009 | Ullrich et al. | |
| 2009/0015560 A1 | 1/2009 | Robinson et al. | |
| 2009/0135142 A1 | 5/2009 | Fu et al. | |
| 2009/0143142 A1 | 6/2009 | Marcus et al. | |
| 2009/0284485 A1 | 11/2009 | Colgate et al. | |
| 2009/0322496 A1 | 12/2009 | da Costa | |
| 2010/0090813 A1 | 4/2010 | Je et al. | |
| 2010/0108408 A1 | 5/2010 | Colgate et al. | |
| 2010/0128002 A1 * | 5/2010 | Stacy | G06F 3/016 345/174 |
| 2010/0141606 A1 * | 6/2010 | Bae | G06F 3/016 345/174 |
| 2010/0156818 A1 | 6/2010 | Burrough et al. | |
| 2010/0156845 A1 * | 6/2010 | Kim | G06F 3/016 345/174 |
| 2010/0164894 A1 * | 7/2010 | Kim | G06F 3/016 345/173 |
| 2010/0177050 A1 | 7/2010 | Heubel et al. | |
| 2010/0231508 A1 | 9/2010 | Cruz-Hernandez et al. | |
| 2010/0231539 A1 | 9/2010 | Cruz-Hernandez et al. | |
| 2010/0231540 A1 | 9/2010 | Cruz-Hernandez et al. | |
| 2010/0231541 A1 | 9/2010 | Cruz-Hernandez et al. | |
| 2010/0231550 A1 | 9/2010 | Cruz-Hernandez et al. | |
| 2010/0265191 A1 | 10/2010 | Mui et al. | |
| 2010/0309141 A1 | 12/2010 | Cruz-Hernandez et al. | |
| 2010/0309142 A1 | 12/2010 | Cruz-Hernandez et al. | |
| 2011/0102355 A1 | 5/2011 | Aono et al. | |
| 2011/0102358 A1 | 5/2011 | Aono et al. | |
| 2011/0148795 A1 | 6/2011 | Aono et al. | |
| 2011/0163984 A1 | 7/2011 | Aono | |
| 2011/0169758 A1 | 7/2011 | Aono | |
| 2011/0169765 A1 * | 7/2011 | Aono | G06F 3/016 345/173 |
| 2011/0181538 A1 * | 7/2011 | Aono | G06F 3/016 345/173 |
| 2011/0181539 A1 * | 7/2011 | Aono | G06F 3/0414 345/173 |
| 2011/0260988 A1 | 10/2011 | Colgate et al. | |
| 2011/0260991 A1 | 10/2011 | Aono | |
| 2011/0267294 A1 | 11/2011 | Kildal | |
| 2012/0162114 A1 | 6/2012 | Inoue et al. | |
| 2012/0194460 A1 | 8/2012 | Kuwabara et al. | |
| 2012/0286847 A1 | 11/2012 | Peshkin et al. | |
| 2013/0222303 A1 | 8/2013 | Colgate et al. | |
| 2013/0307789 A1 | 11/2013 | Karamath et al. | |
| 2013/0314220 A1 | 11/2013 | Colgate et al. | |

FOREIGN PATENT DOCUMENTS

| | | |
|---|---|---|
| CN | 1882904 A | 12/2006 |
| JP | H04-046095 B2 | 7/1992 |
| JP | H10-293644 A | 11/1998 |
| JP | H11-212725 A | 8/1999 |
| JP | 2003-288158 A | 10/2003 |
| JP | 2005-258666 A | 9/2005 |
| JP | 2007-065814 A | 3/2007 |
| JP | 2008-130055 A | 6/2008 |
| WO | 2009/051976 A1 | 4/2009 |

OTHER PUBLICATIONS

Summons to attend oral proceedings pursuant to Rule 115(1) EPC issued by the European Patent Office on Nov. 27, 2015, which corresponds to European Patent Application No. 10811493.5-1954 and is related to U.S. Appl. No. 13/392,855.

"Notification of the Third Office Action," issued by the State Intellectual Property Office of China dated Dec. 12, 2014, which corresponds to Chinese Patent Application No. 201080038142.7 and is related to U.S. Appl. No. 13/392,855; with English translation.

(56) References Cited

OTHER PUBLICATIONS

An Office Action; "Communication pursuant to Article 94(3) EPC," issued by the European Patent Office dated Jun. 18, 2014, which corresponds to European Patent Application No. 10 811 493.5-1954 and is related to U.S. Appl. No. 13/392,855.
An Office Action; "Notice of Reason for Rejection," issued by the Japanese Patent Office dated Feb. 12, 2014, which corresponds to Japanese Patent Application No. 2010-149063 and is related to U.S. Appl. No. 13/392,855; with English language concise explanation.
"Notification of the First Office Action," issued by the State Intellectual Property Office of China dated Feb. 14, 2014, which corresponds to Chinese Patent Application No. 201080038142.7 and is related to U.S. Appl. No. 13/392,855; with English translation.
An Office Action issued by the Korean Patent Office dated Nov. 6, 2013, which corresponds to Korean Patent Application No. 2012-7005041 and is related to U.S. Appl. No. 13/392,855; with English Concise Explanation.
An Office Action; "Decision of Rejection," issued by the Japanese Patent Office dated Nov. 12, 2013, which corresponds to Japanese Patent Application No. 2010-106785 and is related to U.S. Appl. No. 13/392,855; with English Concise explanation.
An Office Action "Decision of Refusal" issued by the Japanese Patent Office dated Sep. 3, 2013, which corresponds to Japanese Application No. 2010-241395 and is related to U.S. Appl. No. 13/392,855; with Concise Explanation.
Japanese Office Action "Notification of Reason for Refusal" dated Feb. 21, 2012; Japanese Patent Application No. 2010-106785 with translation.
Japanese Office Action; "Notification of Reasons for Refusal"; drafted on Feb. 26, 2010; Japanese Patent Application No. 2009-1974-44 with translation.
Japanese Office Action; "Notification of Reasons for Refusal"; drafted on Dec. 16, 2011; Japanese Patent Application No. 2009-197444 with translation.
Japanese Office Action; "Official Decision of Refusal"; drafted on Jul. 20, 2010; Japanese Patent Application No. 2009-197444 with translation.
Japanese Office Action; "Interrogation"; drafted on Aug. 17, 2011; Japanese Patent Application No. 2009-197444 with translation.
Japanese Office Action; "Notification of Reasons for Refusal"; drafted on Nov. 30, 2011; Japanese Patent Application No. 2010-106785 with translation.
The extended European Search Report dated Feb. 18, 2013, which corresponds to EP Application No. 10811493.5 and is related to U.S. Appl. No. 13/392,855.
International Search Report; PCT/JP2010/005186; dated Oct. 5, 2010.
S.Mizuno; Japanese Office Action; Japanese Patent Application No. 2009-197444; dated Aug. 23, 2011.
An Office Action issued by the Korean Intellectual Property Office dated May 28, 2013, which corresponds to Korean Patent Application No. 10-2012-7005041, and is related to U.S. Appl. No. 13/392,855, with translation.

\* cited by examiner

TACTILE SENSATION PROVIDING APPARATUS AND CONTROL METHOD FOR TACTILE SENSATION PROVIDING APPARATUS

CROSS-REFERENCE TO RELATED APPLICATIONS

This application is a Continuation Application of U.S. patent application Ser. No. 13/392,855, filed Feb. 27, 2012, which is the U.S. National Phase of International Application No. PCT/JP2010/005186 filed Aug. 23, 2010, which claims priority to and the benefit of Japanese Patent Application No. 2009-197444 filed Aug. 27, 2009 and Japanese Patent Application No. 2010-149063 filed Jun. 30, 2010, the entire contents of which are incorporated herein by reference.

TECHNICAL FIELD

The present disclosure relates to a tactile sensation providing apparatus having a touch sensor and a control method for a tactile sensation providing apparatus.

BACKGROUND ART

In recent years, input apparatuses having touch sensors such as touch panels, touch switches or the like are popularly used as input apparatuses such as operation units, switches and the like for receiving input operations by a user in mobile terminals such as mobile phones, gaming machines, information equipments such as calculator, ticket vending machines, home electric appliances such as microwaves, TV sets, lighting equipments, industrial equipments (FA equipments) and the like.

There are known a variety of types of those touch sensors, such as a resistive film type, a capacitive type, an optical type and the like. However, touch sensors of these types receive a touch input by a finger or a stylus pen and, unlike push-button switches, the touch sensors themselves are not physically displaced even when being touched.

Since the touch sensors are not physically displaced when touched, an operator cannot obtain feedback to an input even when the touch input is received. As a result, the operator is likely to input erroneously by touching the same spot multiple times, which may be stressful for the operator.

As methods to prevent such repetitious inputs, there are known methods of visually or auditory confirming the input operations by, for example, generating sounds or by changing a display state, such as colors of input objects such as input buttons and the like graphically depicted on a display unit, according to an input position upon reception of the touch input.

However, such auditory feedback may be difficult to be confirmed in a noisy environment and is not applicable when the equipment being used is in a silent mode. In addition, in using such visual feedback, when the operator is inputting by the finger, if the input object displayed on the display unit is small, the operator may not be able to confirm the change in the display state, as a view of the input object is blocked by a finger.

There is also suggested a feedback method relying on neither the auditory— nor visual sensation but instead generating a tactile sensation at operator's fingertip by vibrating the touch sensor when the touch sensor receives an input (for example, see Patent Documents 1, 2).

As a method to provide a more detailed tactile sensation, in addition, there is known a feedback method to calculate a sliding speed of a user's finger and the like from a contact position on the touch sensor in order to generate a plurality of types of vibrations having vibration times differing among users corresponding to the sliding speeds (for example, see Patent Document 3).

RELATED ART DOCUMENTS

Patent Documents

Patent Document 1: Japanese Patent Laid-Open No. 2003-288158
Patent Document 2: Japanese Patent Laid-Open No. 2008-130055
Patent Document 3: Japanese Patent No. 4046095 Specification

SUMMARY

Technical Problem

The techniques disclosed in the above Patent Documents 1 and 2, however, merely vibrate the touch sensor when the touch sensor receives an input. Therefore, in using the input apparatus having the button switches such as push-button switches (push-type button switches) are graphically depicted on the touch sensor, and, if the touch sensor has a low threshold to receive an input, a tactile sensation is provided when the finger or the like lightly contacts (touches) the touch sensor. It may trigger erroneous operations in response to an unintentional motion (touch) before the operator pushes, and inflict a feeling of strangeness on the operator upon the unintentional motion (touch). Here, the threshold for the touch sensor to receive the touch input is a threshold at which the touch sensor responds, which is, for a touch sensor of the resistive film type, a threshold of a pressure at which an upper conductive film is contacted to a lower conductive film, and, for a touch sensor of the capacitive type, a threshold for detection of an electric signal by contact.

In order to address such a disadvantage, the applicant has developed a tactile sensation providing apparatus which detects a pressure load on a touch face of the touch sensor and, when the detected pressure load reaches a predetermined threshold to provide the tactile sensation, vibrates the touch face of the touch sensor such that the tactile sensation is provided to a pressing object such as the finger and the like.

According to this input apparatus, since the tactile sensation is provided when the operator pushes the touch face and the pressure load reaches the predetermined threshold, it is possible to allow the operator to perceive reception of an input while reliably preventing erroneous operations triggered by an unintentional touch as described above and the feeling of strangeness.

The technique disclosed in Patent Document 3 set forth above does not take into account a change in a vibration amount of the touch face corresponding to a position on the touch face in providing the tactile sensation to the user. As a result of earnest investigations and studies on the change in the vibration amount of the touch face corresponding to the position on the touch face, the inventor obtained expertise as follows. FIG. 7 is a diagram illustrating an example of an arrangement of vibration elements on the touch face of the touch sensor, and FIG. 8 is a diagram illustrating a distribution of the vibration amount by a predetermined drive voltage when the vibration elements are arranged as illustrated in FIG. 7. As illustrated in FIG. 8, when each of the vibration elements illustrated in FIG. 7 is vibrated by the predetermined drive voltage (for example, 1 V), the vibration amount of the touch face takes a different value depending on a pushed position on the touch face. In an example illustrated in FIG. 8, the vibration amounts (amplitude) of positions A, B and C are 20 μm, 15 μm and 17 μm, respectively. A number of factors including attenuation of vibration in accordance with a distance from the vibration element and influence of a reflected wave may be considered as reasons for difference in the vibration amount depending on the position on the touch face. Such a difference in amplitude of vibration of the touch face has a great impact on the tactile sensation the user feels.

Since the technique disclosed in Patent Document 3 does not take into account the change in the vibration amount of the touch face depending on the position on the touch face as described above, the vibration element is driven by the same drive signal in response to the same input operation by the user (for example, motion with the same sliding speed), regardless of the position of the input on the touch face by the user. In this case, however, since the amplitude of vibration of the touch face differs depending on the position on the touch face, the user feels a different tactile sensation at each position. That is, the user have an increased feeling of strangeness in operation as obtaining different tactile sensations at different positions on the touch face in response to the same input operation. In order to improve an operation sensation of the user, it is preferable to provide the same tactile sensation to the user, regardless of the position of the input.

An object of the present disclosure, in order to meet such a requirement, is to provide the tactile sensation providing apparatus and methods for providing the constant tactile sensation to the user, regardless of a position of an input by the user.

Solution to Problem

In order to achieve the above object, the present disclosure provides the following:

A tactile sensation providing apparatus according to the present disclosure comprises a touch sensor configured to detect a touch input, a load detection unit configured to detect a pressure load on a touch face of the touch sensor, a tactile sensation providing unit configured to vibrate the touch face, and a control unit configured to adjust a drive signal of the tactile sensation providing unit based on a pushed position when the pressure load detected by the load detection unit satisfies a standard to provide a tactile sensation.

A control method according to the present disclosure, for a tactile sensation providing apparatus including a touch sensor configured to detect a touch input, a load detection unit configured to detect a pressure load on a touch face of the touch sensor, and a tactile sensation providing unit configured to vibrate the touch face, the control method, comprises adjusting a drive signal of the tactile sensation providing unit based on a pushed position when the pressure load detected by the load detection unit satisfies a standard to provide a tactile sensation.

A tactile sensation providing apparatus according to the present disclosure comprises a touch sensor configured to detect a touch input, a piezoelectric element mounted on the touch sensor, and a control unit configured to detect a pressure load on a touch face of the touch sensor based on an output signal of the piezoelectric element. When the pressure load detected satisfies a standard to provide a tactile sensation, the control unit is configured to adjust a drive signal of the piezoelectric element based on a pushed position.

A control method according to the present disclosure, for a tactile sensation providing apparatus including a touch sensor configured to detect a touch input, and a piezoelectric element mounted on the touch sensor, comprises detecting a pressure load on a touch face of the touch sensor based on an output signal of the piezoelectric element and, when the pressure load detected satisfies a standard to provide a tactile sensation, adjusting a drive signal of the piezoelectric element based on a pushed position.

Effect of the Disclosure

The tactile sensation providing apparatus according to the present disclosure controls based on the pushed position of the pressing object such as a user's finger and the like such that the tactile sensation is provided to a user by the vibration with the certain amplitude. Thereby, a constant tactile sensation is provided to the user regardless of a position of an input by the user.

DESCRIPTION OF EMBODIMENTS

Embodiments of the present disclosure will be described with reference to the accompanying drawings.

First Embodiment

Figure 1:
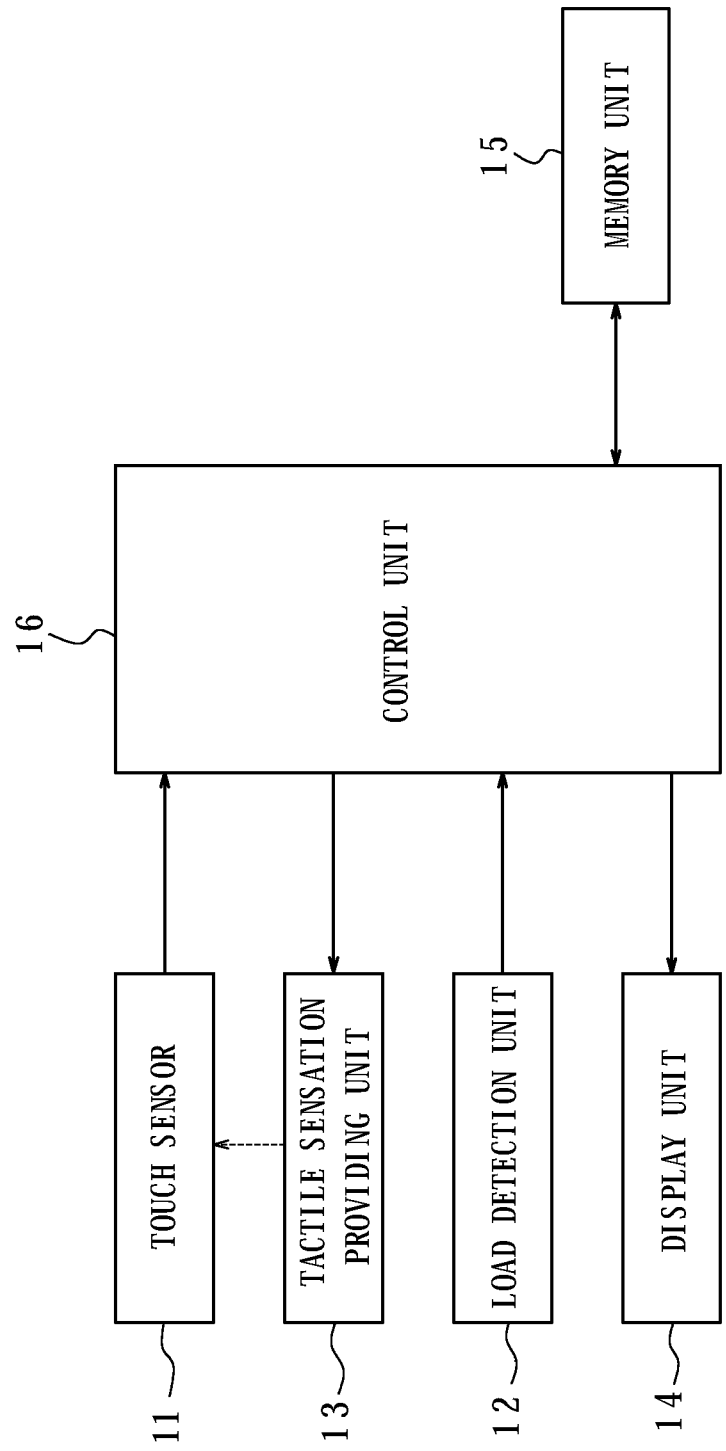
FIG. 1 is a functional block diagram illustrating a tactile sensation providing apparatus according to a first embodiment of the present disclosure.

FIG. 1 is a functional block diagram illustrating a tactile sensation providing apparatus according to a first embodiment of the present disclosure. This tactile sensation providing apparatus has a touch sensor 11, a load detection unit 12, a tactile sensation providing unit 13, a display unit 14, a memory unit 15, and a control unit 16 to control overall operations.

The touch sensor 11, disposed on the display unit 14, detects a touch input to a touch face by a touch object such as a finger and the like and may be of a known type, such as a resistive film type, a capacitive type, an optical type and the like to output two-dimensional position information of a touch position (pushed position of a pressing object such as the finger and the like). The load detection unit 12 detects a pressure load on the touch face of the touch sensor 11 by the pressing object such as the finger and the like and may be, for example, a strain gauge sensor, a piezoelectric element and the like, which linearly react to the load. The tactile sensation providing unit 13 vibrates the touch sensor 11 and may be, for example, the piezoelectric element.

The display unit 14 displays an input object of an input button and the like such as a push-button switch (push-type button switch) and constituted by using, for example, a liquid crystal display panel, an organic EL display panel and the like. The touch input to the input object displayed on the display unit 14 is detected by the control unit 16 based on the position information output from the touch sensor 11. The memory unit 15 stores various information such as drive signal information of the tactile sensation providing unit 13 and drive adjustment information to adjust a drive signal based on the pushed position of the pressing object and may be configured by using, for example, a volatile memory or a nonvolatile memory. The control unit 16 may include, for example, a CPU and the like and controls drive of the tactile sensation providing unit 13 based on information with respect to the pushed position of the pressing object from the touch sensor 11, pressure load information from the load detection unit 12, and the drive signal information and the drive adjustment information stored in the memory unit 15.

The drive signal information of the tactile sensation providing unit 13 stored in the memory unit 15 includes various information such as a frequency and the number of vibration periods to vibrate the touch face for each tactile sensation to be provided to a user. The control unit 16 controls drive of the tactile sensation providing unit 13 based on the drive signal information stored in the memory unit 15, and provides the pressing object such as the finger and the like with various tactile sensations such as, for example, a "throbbing" sensation, a "vibrating" sensation and a "plock" sensation. Here, when the tactile sensation providing unit 13 is a piezoelectric element, in order to provide soft tactile sensations such as, for example, the "throbbing" sensation and the "vibrating" sensation, the control unit 16 applies a drive signal, a triangle wave or a sine wave with a frequency of approximately 200 Hz to 500 Hz, for two or three periods to the piezoelectric element. In order to provide a hard tactile sensation such as the "plock" sensation, the control unit 16 applies a drive signal, a square wave with a frequency of approximately 200 Hz to 500 Hz, for two or three periods to the piezoelectric element.

In order to enhance an operation sensation of the user, in addition, the control unit 16 can control drive of the tactile sensation providing unit 13 such that a click sensation such as a "ticking" sensation is provided to the pressing object such as the finger and the like. In order to provide the click sensation such as the "ticking" sensation obtained when pressing a hard-type push-button switch, the control unit 16 applies the drive signal, a sine wave or a square wave with a frequency of approximately 100 Hz to 200 Hz, for one period. With the click sensation such as the "ticking" sensation, the user can obtain the tactile sensation similar to that obtained when pressing the actual push-button switch even when inputting to the input object graphically depicted on the display unit 14. Therefore, the operation sensation of the user is improved.

The drive adjustment information stored in the memory unit 15 for adjustment of the drive signal based on the pushed position of the pressing object includes various information such as voltage adjustment information for adjustment of voltage to apply to the tactile sensation providing unit 13 and phase adjustment information for adjustment of a phase of vibration between vibration elements.

Voltage Adjustment Information

Figure 7:
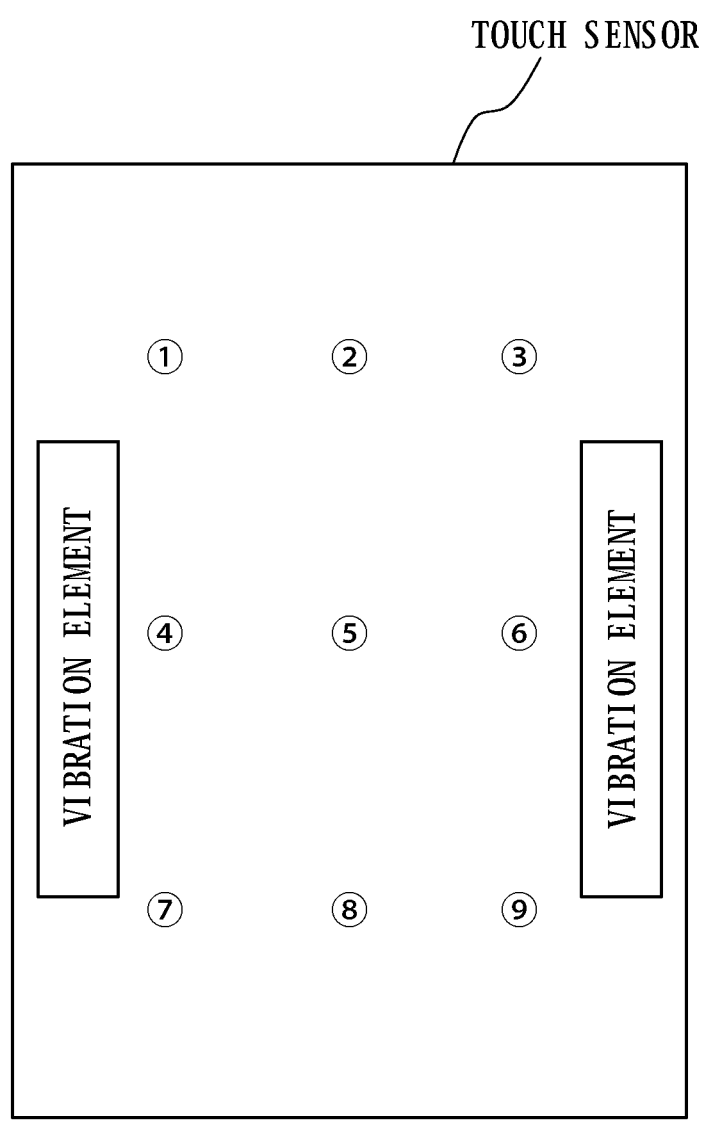
FIG. 7 is a diagram illustrating an exemplary arrangement of vibration elements on a touch face of the touch sensor.
Figure 8:
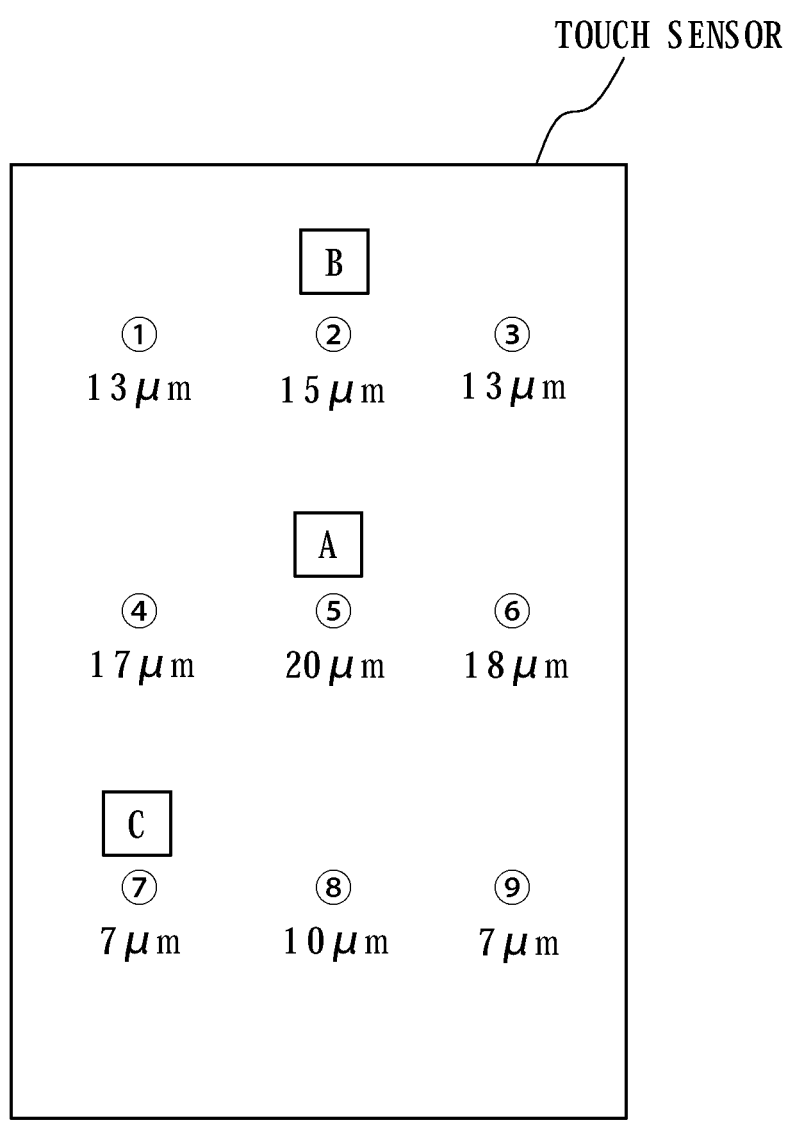
FIG. 8 is a diagram illustrating a distribution of vibration amounts by a predetermined drive voltage with the vibration elements being arranged as illustrated in FIG. 7.
Figure 9:
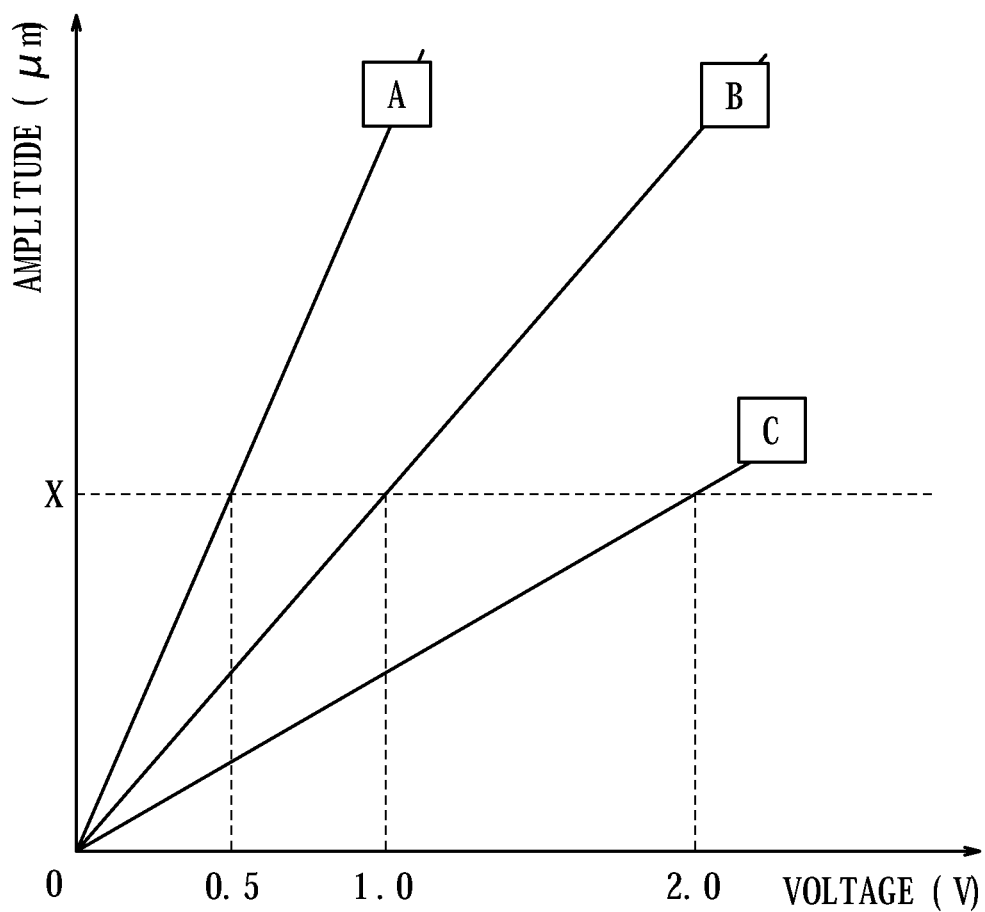
FIG. 9 is a diagram illustrating a relationship between the drive voltage and the vibration amount at each position with the vibration elements being arranged as illustrated in FIG. 7.

FIG. 9 is a diagram illustrating a relationship between the drive voltage and a vibration amount at each position having the vibration elements arranged as illustrated in FIG. 7. In a case illustrated in FIG. 9, in order to generate vibration with certain amplitude X (μm) at positions A, B and C, necessary drive voltages are 0.5 V, 1.0 V and 2.0 V, respectively. As such, it is considered that the relationship between positions on the touch face of the touch sensor 11 and necessary drive voltages to generate vibration with predetermined amplitude as described above is preliminarily measured and stored as a table or a list in the memory unit 15 at shipment of products. For example, the touch face of the touch sensor 11 is divided into m'n areas having m areas in a vertical direction and m areas in a lateral direction, and the relationship between the amplitude and the drive voltage for each of the areas is stored in the memory unit 15. With such voltage adjustment information, the control unit 16, in order to generate vibration with the predetermined amplitude, adjusts the drive voltage based on the pushing position of the pressing object (pressing means) by, for example, increasing to double (for example, 2.0 V) of a standard drive voltage of the drive signal (for example, 1.0 V) or by reducing to half (for example, 0.5 V) of the standard voltage.

Figure 10:
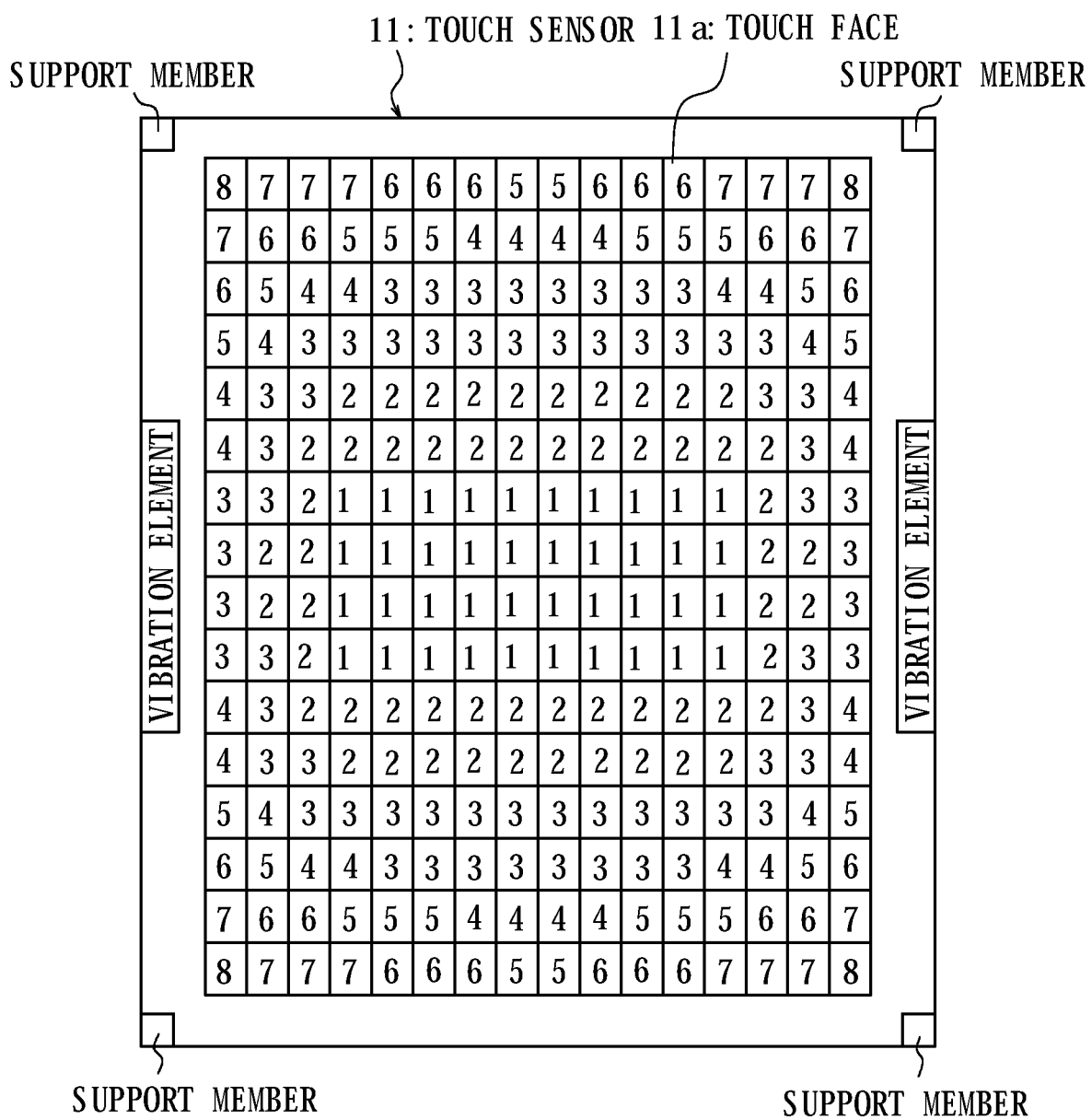
FIG. 10 is a diagram illustrating an example of voltage adjustment information set for each area on the touch face of the touch sensor.

FIG. 10 is a diagram illustrating an example of the voltage adjustment information set for each of the areas of the touch face 11a of the touch sensor 11. In this example, the touch sensor 11 is supported by support members made of elastic members at four corners and two vibration elements (for example, piezoelectric elements) are arranged at centers of two opposing peripheries of the touch sensor 11. In addition, voltage adjustment coefficients (1-8) for the standard drive voltage are set as the voltage adjustment information for each of the areas of the touch face 11a. It is to be noted that the numbers of the voltage adjustment coefficients indicate not absolute intensities but relative intensities among the voltage adjustment coefficients.

In the example in FIG. 10, relatively high voltage adjustment coefficients are set for areas near the support members, whereas relatively low voltage adjustment coefficients are set for central areas of the touch face 11a distant from the support members. This is because, when the vibration elements are vibrated by a typical drive voltage, the areas of the touch face 11a near the support members have small vibration amounts, whereas the central of the touch face 11a have large vibration amounts. In the example illustrated in FIG. 10, in addition, the voltage adjustment coefficients of the areas near the support members are finely changed, while those of the central areas of the touch face 11a distant from the support members are less changed. This is because, when the vibration elements are vibrated by a typical drive voltage, the vibration amounts of the touch face 11a significantly differ among the positions of the areas near the support members, whereas the vibration amounts of the touch face 11a differ by small amounts among the positions of areas near the center of the touch face 11a distant from the support members.

In the example in FIG. 10, in addition, comparing areas near the centers of the peripheries, for example, relatively small voltage adjustment coefficients are set for the areas near the centers of the peripheries having the vibration elements disposed thereon, whereas relatively large voltage adjustment coefficients are set for the areas near the centers of the peripheries without the vibration elements. This is because, when the vibration elements are vibrated by a typical drive voltage, the peripheries having the vibration elements disposed thereon have large vibration amounts of the touch face 11a, while the peripheries without the vibration elements have small vibration amounts of the touch face 11a. In the example in FIG. 10, further, the voltage adjustment coefficients are changed by small amounts in the areas near the centers of the peripheries having the vibration elements disposed thereon, while the voltage adjustment coefficients are finely changed in the areas near the centers of the peripheries without the vibration elements. This is because, when the vibration elements are vibrated by a typical drive voltage, the vibration amounts of the touch face 11a differ by small amounts among the areas near the centers of the peripheries having the vibration elements disposed thereon, whereas the vibration amounts of the touch face 11a significantly differ among the areas near the centers of the peripheries without the vibration elements.

Figure 11:
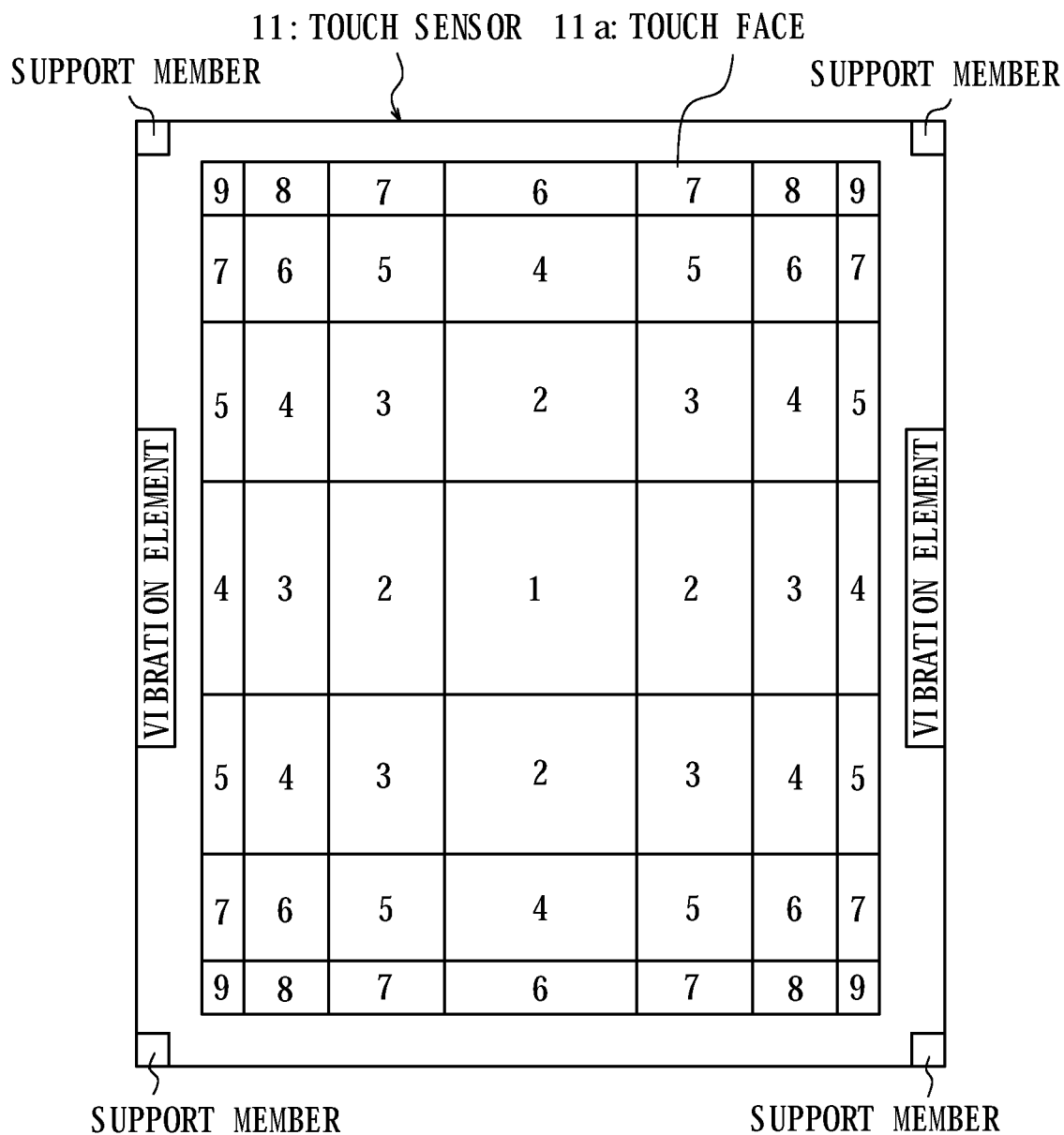
FIG. 11 is a diagram illustrating an example of the voltage adjustment information set for each area in a size corresponding to its position on the touch face.

Here, the areas to be set with the voltage adjustment coefficients do not necessarily have to be in the same size. FIG. 11 is a diagram illustrating an example of the voltage adjustment information set for each of the areas in sizes according to their positions on the touch face 11a. In FIG. 11, the areas near the support members are set in relatively small sizes, whereas the areas near the center of the touch face 11a distant from the support members are set in relatively large sizes. This is because, as described with reference to FIG. 10, the voltage adjustment coefficients are to be finely changed among the areas near the support members, while the voltage adjustment coefficients are not to be finely changed among the areas near the center of the touch face 11a distant from the support members. As with in a comparison of the areas near the centers of the peripheries, relatively small voltage adjustment coefficients are set for the areas near the centers of the peripheries having the vibration elements disposed thereon, whereas relatively large voltage adjustment coefficients are set for the areas near the centers of the peripheries without the vibration element. This is because, as described with reference to FIG. 10, when the vibration elements are vibrated by a typical drive voltage, the peripheries of the touch face 11a having the vibration elements disposed thereon have large vibration amounts, while the peripheries of the touch face 11a without the vibration elements have small vibration amounts. An appropriate voltage adjustment is enabled, even if there are a small number of areas, by setting the voltage adjustment information for each of the areas in sizes according to their positions on the touch face 11a as illustrated in FIG. 11.

Figure 12:
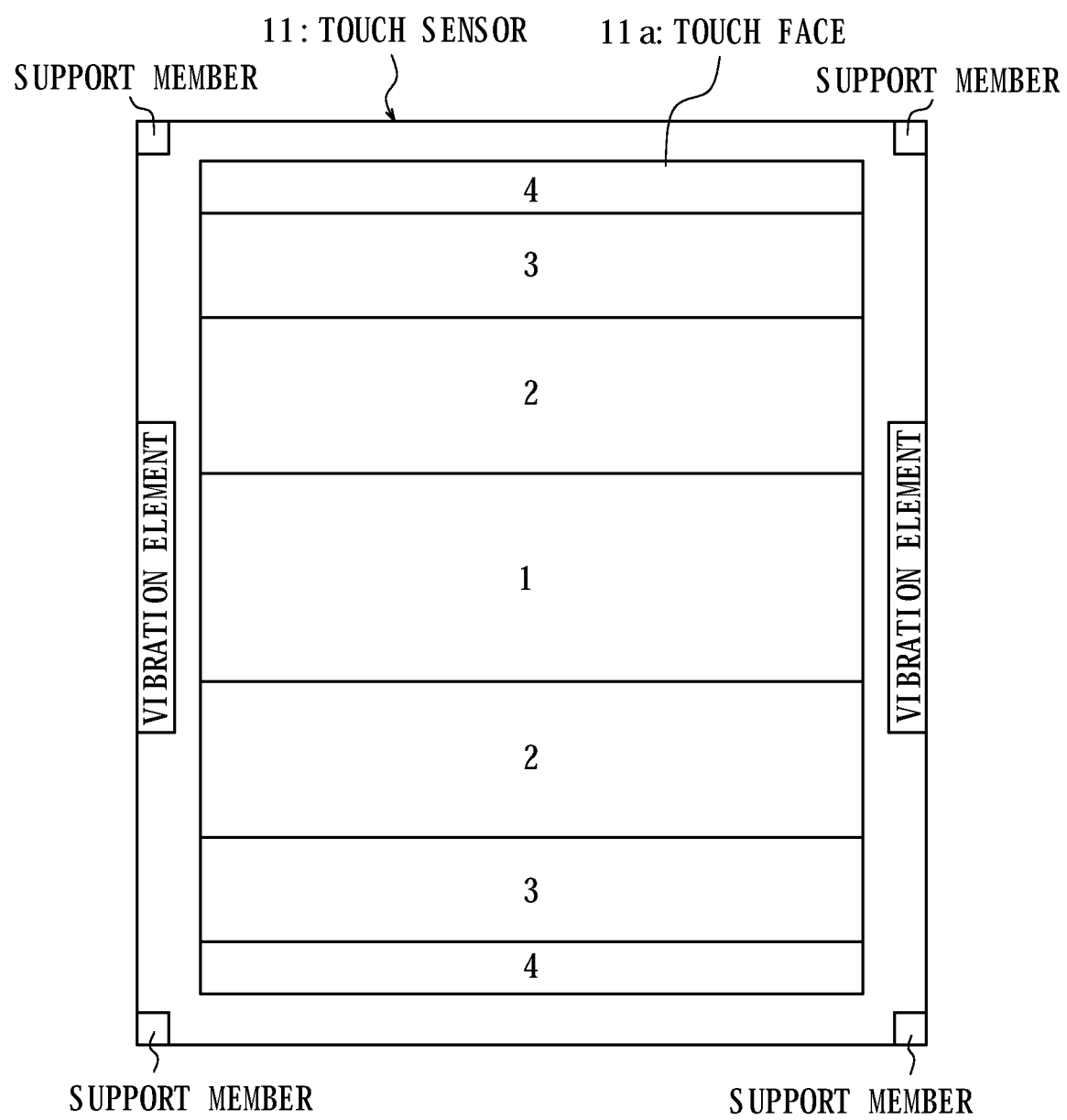
FIG. 12 is a diagram illustrating an example of the voltage adjustment information set for each area in a size corresponding to its position on the touch face.

FIG. 12 is a diagram illustrating another example of the voltage adjustment information set for each of the areas in sizes according to their positions on the touch face 11a. In FIG. 12, the touch face 11a is divided into areas in a direction (vertical direction) of the peripheries having the vibration elements disposed thereon, and those areas are smaller in size as closer to the support members. In FIG. 12, in addition, the touch face 11a is not divided in a direction (lateral direction) of the peripheries without the vibration elements. As described with reference to FIG. 10, when the vibration elements are vibrated by a typical drive voltage, the areas of the touch face 11a near the vibration elements have relatively large vibration amounts. Therefore, the areas distant from the central of the touch face 11a have relatively small attenuation of the vibration amounts. Taking the positions of the vibration elements in consideration, the touch face 11a may be divided into areas in the direction (vertical direction) of the peripheries having the vibration elements disposed thereon, without dividing the touch face 11a into areas in the direction (lateral direction) of the peripheries without the vibration elements. It is enabled to appropriately adjust the voltage, even if there are only a small number of areas, by dividing the touch face 11a, as illustrated in FIG. 12, based on the positions of the vibration elements and setting the voltage adjustment information for each of the areas in sizes corresponding to their positions on the touch face 11a.

Figure 13:
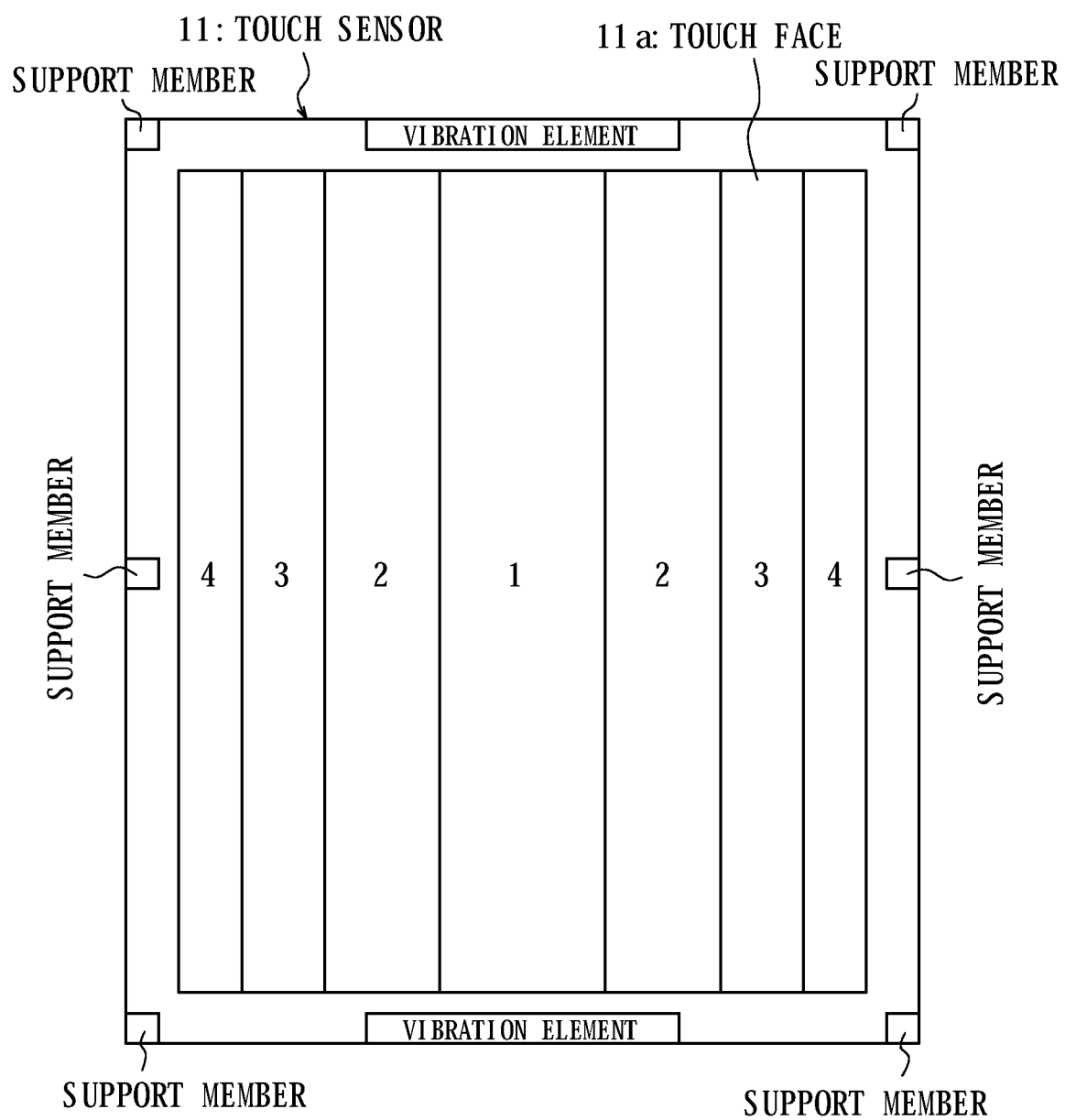
FIG. 13 is a diagram illustrating an example of the voltage adjustment information set for each area in a size corresponding to its position on the touch face.
Figure 14:
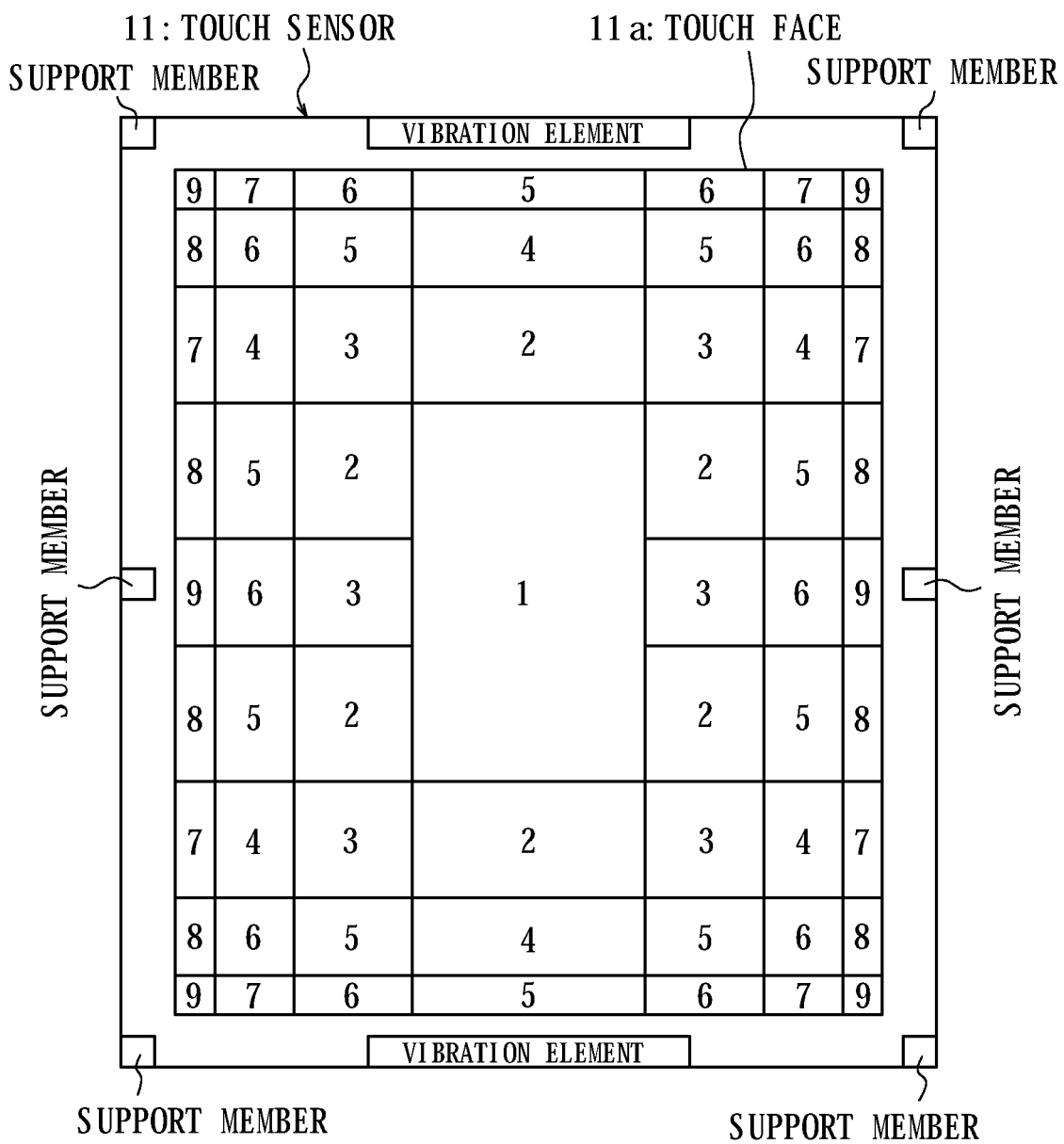
FIG. 14 is a diagram illustrating an example of the voltage adjustment information set for each area in a size corresponding to its position on the touch face.

FIG. 13 is a diagram illustrating an example of the voltage adjustment information set for each of the areas. In FIG. 13, the touch sensor 11 is supported by six support members made of the elastic members in total; at four corners, a center of a left periphery and a center of a right periphery. Two piezoelectric elements serving as the vibration elements are disposed on the center of opposing peripheries of the touch sensor 11. In FIG. 13, in the similar manner to FIG. 12, the touch face 11a is divided into areas in the direction (lateral direction) of the peripheries having the vibration elements disposed thereon and the areas are smaller as closer to the support members. In addition, FIG. 14 is a diagram illustrating another example of the voltage adjustment information set for each of the areas. In FIG. 14, the touch face 11a is divided into relatively small areas near the six support members, while the touch face 11a is divided into relatively large areas near the center of the touch face 11a distant from the support members. The areas to set the voltage adjustment coefficients do not need to be divided in a matrix form. As with the area at the center of the touch face 11a having a voltage adjustment coefficient "1" set thereto, it is enabled to diversify division of the areas to set the voltage adjustment coefficients. Thereby, more appropriate adjustment of the voltage is enabled.

Phase Adjustment Information

Also, with the vibration elements arranged as illustrated in FIG. 7, controlling the amplitude of each position is enabled by synthesizing the vibrations of the vibration elements, that is, by forming a synthesized wave consisting of a plurality of vibrations. For example, it is assumed that, in order to generate a synthesized wave having vibration with the certain amplitude x (μm) at the positions A, B and C, it is necessary to set a phase difference of the vibrations between two vibration elements illustrated in FIG. 7 to be π/4, 0 and 3π/4, respectively. In this case, a relationship between the positions on the touch face of the touch sensor 11 and the phase difference necessary to generate the vibration with predetermined amplitude is preliminarily measured and stored as a table or a list in the memory unit 15 at shipment of the products. For example, the touch face of the touch sensor 11 may be divided into m'n areas consisting of m areas in the vertical direction and n areas in the lateral direction, and the relationship between the amplitude and the phase difference for each of the areas is stored in the memory unit 15. In order to generate the vibration with the predetermined amplitude, the control unit 16 is enabled to adjust the phase of the drive signal based on such the phase adjustment information, such as by setting the phase difference of the drive signal applied to each of the tactile sensation providing units 13 to be, for example, π/4 or 3π/4 of a standard phase difference (for example, 0) based on the pushed position of the pressing object.

In the similar manner to the voltage adjustment coefficients illustrated in FIG. 11 to FIG. 14, the areas to set the phase adjustment information do not need to be in the same size. For example, the sizes of the areas to set the phase adjustment information may be determined based on their positions on the touch face. Also, the touch face may be divided into areas to set the phase adjustment information based on a position of the vibration element.

It is to be noted that the drive adjustment information stored in the memory unit 15 to adjust the drive signal based on the pushed position of the pressing object is not limited to the voltage adjustment information for adjustment of the voltage to apply to the tactile sensation providing unit 13 and the phase adjustment information for adjustment of the phase of vibration between the vibration elements but may take any parameters associated with adjustment of the drive signal, such as the frequency, the period and amplitude of the drive signal, and a current and a time to apply the drive signal, and the like.

Figure 2A:
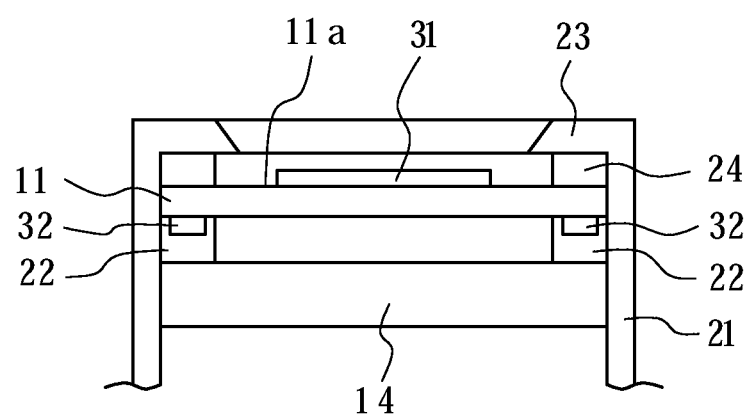
FIGS. 2A and 2B illustrate diagrams illustrating an exemplary housing structure of a part including a touch sensor illustrated in FIG. 1.
Figure 2B:
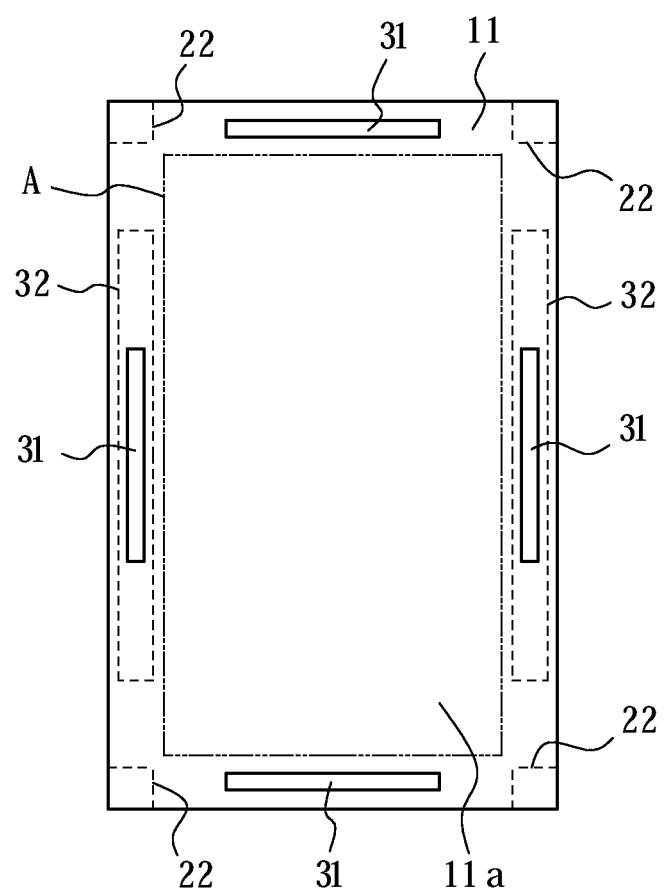

FIGS. 2A and 2B illustrate an exemplary housing structure of a part including the touch sensor 11 illustrated in FIG. 1; FIG. 2A is a cross-sectional view of a main section, and FIG. 2B is a plane view of the main section. The display unit 14 is contained and held in a housing 21. The touch sensor 11 is disposed on the display unit 14 via insulators 22 made of elastic members. According to the present embodiment, the touch sensor 11 and the display unit 14 are rectangular in shape in a planer view and the touch sensor 11 is disposed on the display unit 14 via the insulators 22, which are arranged at the four corners outside a display area A of the display unit 14 illustrated by a chain double-dashed line in FIG. 2B.

In addition, the housing 21 is provided with an upper cover 23 covering a surface area of the touch sensor 11 outside the display area of the display panel 14. Insulators 24 made of elastic members are arranged between the upper cover 23 and the touch sensor 11.

The touch sensor 11 illustrated in FIGS. 2A and 2B may have, for example, a surface member having the touch face 11a and constituted by a transparent film or the glass, and a rear face member constituted by the glass or acryl. The touch sensor 11 is designed such that, when the touch face 11a is pressed down, the pushed position or an entire structure is bent (strained) slightly in accordance with a pressure force.

A load sensor 31 having the strain gauge sensor or the piezoelectric element to detect a load (pressuring force) applied on the touch sensor 11 is provided, adhered or the like, on the surface of the touch sensor 11 at a position close to each side covered by the upper cover 23. In addition, the piezoelectric element 32 to vibrate the touch sensor 11 is provided, adhered or the like, on the rear face of the touch sensor 11 close to each of two opposed sides. That is, the tactile sensation providing apparatus illustrated in FIGS. 2A and 2B have the load detection unit 12 illustrated in FIG. 1 configured by using four strain gauge sensors 31 and the tactile sensation providing unit 13 configured by using two piezoelectric elements 32. The tactile sensation providing unit 13 vibrates the touch sensor 11 to vibrate the touch face 11a such that the tactile sensation is provided to the touch object on the touch face 11a. It is to be noted that the housing 21, the upper cover 23 and the insulator 24 illustrated in FIG. 2A are omitted in FIG. 2B.

According to the tactile sensation providing apparatus of the present embodiment, the touch sensor 11 detects a touch operation to the touch face 11a. Then, the control unit 16 determines whether the pressure load detected by the load detection unit 12 satisfies a standard load (for example, 1.0 N) to provide the tactile sensation. When determining that the pressure load satisfies the standard to provide the tactile sensation, the control unit 16 controls drive of the tactile sensation providing unit 13 based on the pushed position such that the tactile sensation is provided to the pressing object pressing the touch face 11a by vibration with the certain amplitude independent of the pushed position.

Figure 3:
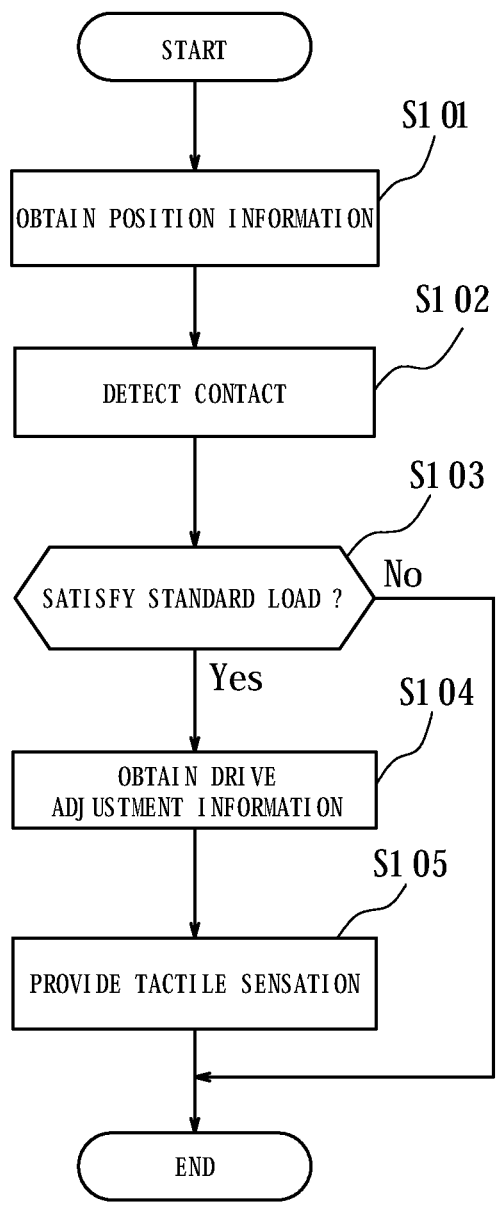
FIG. 3 is a flow chart illustrating an operation to provide a tactile sensation by the tactile sensation providing apparatus according to the first embodiment.

The following is a description of an operation to provide the tactile sensation as notification information by the tactile sensation providing apparatus according to the present embodiment, with reference to a flowchart illustrated in FIG. 3.

First, the control unit 16 detects an input of the position information (pushed position of the pressing object) from the touch sensor 11 (step S101) and detects contact to the touch face 11a by the finger and the like (step S102). Next, the control unit 16 determines whether the pressure load input from the load detection unit 12 satisfies the standard load (1.0 N) to provide the tactile sensation (step S103). As a result, when determining that the pressure load satisfies the standard load (Yes), the control unit 16, from the memory unit 15, retrieves the drive signal information to provide the tactile sensation and the drive adjustment information corresponding to the position information from the touch sensor 11 (step S104). The control unit 16 adjusts the drive signal information based on the drive adjustment information and drives the tactile sensation providing unit 13 with the adjusted drive signal such that the tactile sensation is provided to the user by the vibration with the certain amplitude independent of the pushed position of the pressing object (step S105). When the drive adjustment information obtained at step S104 is adjustment information for the driving voltage, the control unit 16 adjusts the drive voltage of the drive signal and drives the tactile sensation providing unit 13 such that the tactile sensation is provided to the user by the vibration with the certain amplitude. When the drive adjustment information obtained at step S104 is adjustment information for the phase, the control unit 16 adjusts the phase of the drive signal and drives the tactile sensation providing unit 13 such that the tactile sensation is provided to the user by the vibration with the certain amplitude. Also, the control unit 16 may control drive of the tactile sensation providing unit 13 such that the click sensation is provided as the tactile sensation by the vibration with the certain amplitude.

According to the tactile sensation providing apparatus of the present embodiment, when the user presses the touch face 11a of the touch sensor 11 applying the pressure load satisfying the standard to provide the tactile sensation, the control unit 16 controls drive of the tactile sensation providing unit 13 based on the pushed position such that the tactile sensation is provided to the pressing object such as the finger and the like by the vibration with the certain amplitude independent of the pushed position. Thereby, a constant tactile sensation is provided to the user regardless of the position of the input by the user, and thus the operation sensation of the user is improved.

In addition, the control unit 16 provides the tactile sensation by the vibration with the certain amplitude independent of the pushed position to the pressing object such as the finger and the like by adjusting the voltage to be applied to the tactile sensation providing unit 13 based on the pushed position of the pressing object. That is, by adjusting the voltage, a constant tactile sensation is provided to the user regardless of the position of the input by the user, and thus the operation sensation of the user is improved.

Moreover, the control unit 16 provides the tactile sensation to the pressing object such as the finger and the like by the vibration with the certain amplitude independent of the pushed position by adjusting the phase of vibration of the tactile sensation providing unit 13 based on the pushed position of the pressing object. That is, by adjusting the phase, a constant tactile sensation is provided to the user regardless of the position of the input by the user, and thus the operation sensation of the user is improved.

Further, the control unit 16 controls drive of the tactile sensation providing unit 13 such that the click sensation is provided as the tactile sensation with the certain amplitude. Accordingly, the user can obtain the tactile sensation similar to that obtained when pressing the actual button switch even when inputting to the input object graphically depicted on the display unit 14. Thereby, it is possible to further improve the operation sensation of the user.

Second Embodiment

Figure 4:
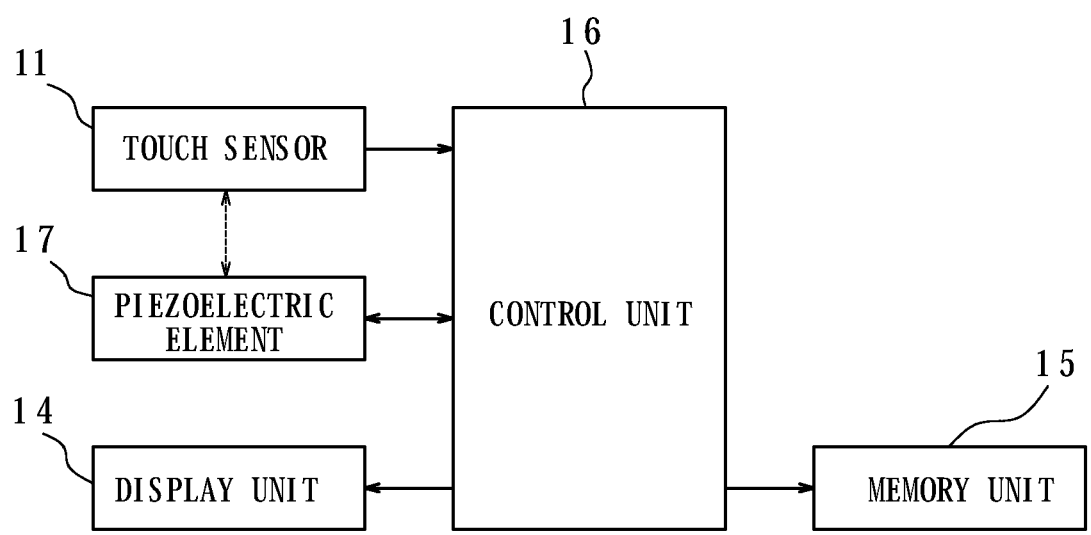
FIG. 4 is a functional block diagram illustrating a tactile sensation providing apparatus according to a second embodiment of the present disclosure.

FIG. 4 is a functional block diagram illustrating a schematic configuration of a tactile sensation providing apparatus according to a second embodiment of the present disclosure. This tactile sensation providing apparatus has a configuration of that according to the first embodiment illustrated in FIG. 1, except for having the piezoelectric element 17 in place of the load detection unit 12 and the tactile sensation providing unit 13. The touch sensor 11, the display unit 14, the memory unit 15 and the control unit 16 have the same functions as those of the first embodiment, and thus detailed descriptions thereof are omitted. According to the present embodiment, the "load detection unit 12" and the "tactile sensation providing unit 13" in the descriptions of the touch sensor 11, the display unit 14, the memory unit 15 and the control unit 16 of the first embodiment are substituted for the "piezoelectric element 17".

The piezoelectric element 17 is mounted on the touch sensor 11. The control unit 16 controls the piezoelectric element 17 to operate in one of a load detection mode to detect the pressure load on the touch face 11a of the touch sensor 11 by utilizing direct piezoelectric effect and a tactile sensation providing mode to vibrate the touch face 11a of the touch sensor 11 by utilizing converse piezoelectric effect. In the load detection mode, an output signal corresponding to the pressure load on the touch face 11a of the touch sensor 11 is provided to the control unit 16. In the tactile sensation providing mode, the touch face 11a of the touch sensor 11 is vibrated based on the drive signal supplied from the control unit 16 such that a predetermined tactile sensation corresponding to the drive signal is provided to the pressing object pressing the touch face.

Figure 5A:
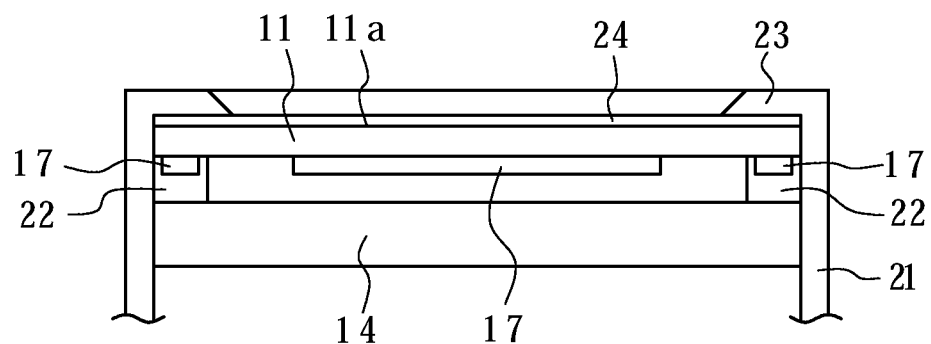
FIGS. 5A and 5B illustrate diagrams illustrating an exemplary housing structure of a part including the touch sensor illustrated in FIG. 4.
Figure 5B:
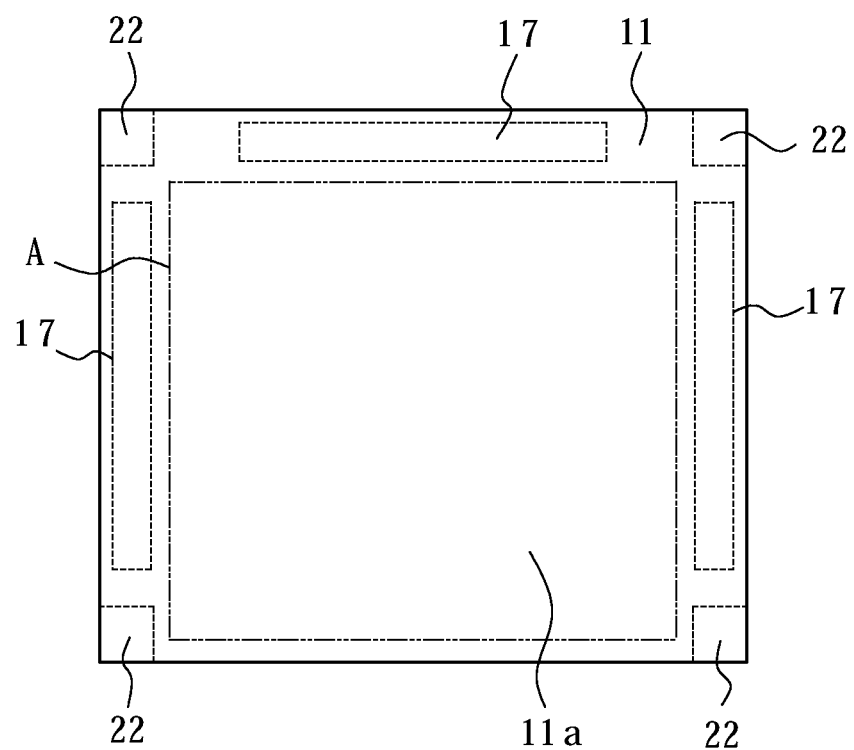

FIGS. 5A and 5B illustrate an exemplary housing structure of the touch sensor 11, the piezoelectric element 17 and the display unit 14 illustrated in FIG. 4; FIG. 5A is a cross-sectional view of a main section, and FIG. 5B is a plane view of the main section. The piezoelectric element 17 is provided on the rear face of the touch sensor 11 at a position covered by the upper cover 23 and close to one or a plurality of peripheries (here, for example, three peripheries), in order to detect the pressure load on the touch face 11a of the touch sensor 11 and also to vibrate the touch sensor 11 such that the tactile sensation is provided to the pressing object pressing the touch face 11a. The three piezoelectric elements 17 supply the outputs to the control unit 16 in parallel. It is to be noted that the housing 21, the upper cover 23 and the insulator 24 illustrated in FIG. 5A are omitted in FIG. 5B.

According to the tactile sensation providing apparatus of the present embodiment, the touch sensor 11 detects the touch operation to the touch face 11a. Then, the control unit 16 determines whether the pressure load detected by the piezoelectric element 17 satisfies the standard load (for example, 1.0 N) to provide the tactile sensation. When determining that the pressure load satisfies the standard load to provide the tactile sensation, the control unit 16 controls drive of the piezoelectric element 17 based on the pushed position such that the tactile sensation is provided to the pressing object pressing the touch face 11a by the vibration with the certain amplitude independent of the pushed position.

Figure 6:
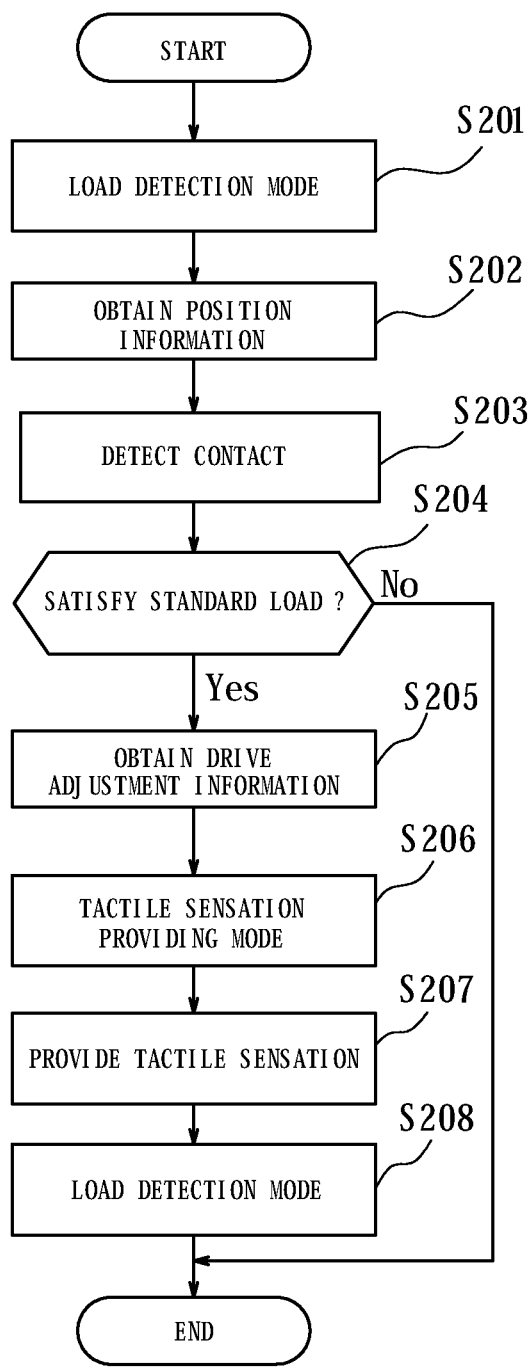
FIG. 6 is a flow chart illustrating an operation to provide the tactile sensation by the tactile sensation providing apparatus according to the second embodiment.

The following is a description of an operation to provide the tactile sensation as the notification information by the tactile sensation providing apparatus according to the present embodiment, with reference to a flowchart illustrated in FIG. 6.

First, the control unit 16 sets the three piezoelectric elements 17 in the load detection mode and monitors outputs from them (step S201). Next, the control unit 16 detects an input of the position information (pushed position of the pressing object) from the touch sensor 11 (step S202) and detects contact to the touch face 11a by the finger and the like (step S203). Then, the control unit 16 calculates the pressure load on the touch sensor 11 based on the outputs of the three piezoelectric elements 17 and determines whether the pressure load satisfies the standard (1.0 N) to provide the tactile sensation (step S204). As a result, when determining that the pressure load satisfies the standard load (Yes), the control unit 16, referring to the memory unit 15, obtains the drive signal information to provide the tactile sensation and the drive adjustment information corresponding to the position information from the touch sensor 11 (step S205). In addition, the control unit 16 changes the mode of the three piezoelectric elements 17 from the load detection mode to the tactile sensation providing mode (step S206). The control unit 16 adjusts the drive signal information based on the drive adjustment information and drives the piezoelectric element 17 based on the adjusted drive signal such that the tactile sensation is provided to the user by the vibration with the certain amplitude (step S207). When the drive adjustment information obtained at step S205 is the adjustment information for the drive voltage, the control unit 16 adjusts the drive voltage of the drive signal and drives the piezoelectric element 17 such that the tactile sensation is provided to the user by the vibration with the certain amplitude. When the drive adjustment information obtained at step S205 is the adjustment information for the phase, the control unit 16 adjusts the phase of the drive signal and drives the piezoelectric element 17 such that the tactile sensation is provided to the user by the vibration with the certain amplitude. Also, the control unit 16 can control drive of the piezoelectric element 17 such that the click sensation is provided as the tactile sensation by the vibration with the certain amplitude. Then, the control unit 16 sets the three piezoelectric elements 17 back in the load detection mode (step S208) and calculates the pressure load on the touch sensor 11.

According to the tactile sensation providing apparatus of the present embodiment, since the piezoelectric element 17 serves as a load sensor to detect the pressure load on the touch face 11a of the touch sensor 11 and as an actuator to vibrate the touch face 11a, the number of components and cost are reduced. In addition, since the number of the components can be reduced, space for the components is saved, and downsizing of the apparatus is enabled.

According to the tactile sensation providing apparatus of the present embodiment, in addition, when the user presses the touch face 11a of the touch sensor 11 applying the pressure load satisfying the standard to provide the tactile sensation, the control unit 16 controls drive of the piezoelectric element 17 based on the pushed position such that the tactile sensation is provided to the pressing object such as the finger and the like by the vibration with the certain amplitude independent of the pushed position. Thereby, a constant tactile sensation is provided to the user regardless of the position of the input by the user, and the operation sensation of the user is improved.

In addition, the control unit 16 adjusts the voltage to be applied to the piezoelectric element 17 based on the pushed position of the pressing object such that the tactile sensation is provided to the pressing object such as the finger and the like by the vibration with the certain amplitude independent of the pushed position. That is, by adjusting the voltage, a constant tactile sensation is provided to the user regardless of the position of the input by the user, and the operation sensation of the user is improved.

Moreover, the control unit 16 adjusts the phase of vibration of the piezoelectric element 17 based on the pushed position of the pressing object such that the tactile sensation is provided to the pressing object such as the finger and the like by the vibration with the certain amplitude independent of the pushed position. That is, by adjusting the phase, a constant tactile sensation is provided to the user regardless of the position of the input by the user, and the operation sensation of the user is improved.

Further, the control unit 16 controls drive of the piezoelectric element 17 to provide the click sensation as the tactile sensation with the certain amplitude. Accordingly, the user obtains the tactile sensation similar to that obtained when pressing the actual button switch even when inputting to the input object graphically depicted on the display unit 14. Thereby, the operation sensation of the user is further improved.

Although the present disclosure is described based on the figures and the embodiments, it is to be understood that various modifications and changes may be implemented by those who are ordinarily skilled in the art. Accordingly, such modifications and changes are included in a scope of the present disclosure. For example, a function and the like included in each element is rearranged by combining a plurality of elements or dividing the element without logical inconsistency.

For example, it is configured that a tactile sensation is stimulated until the load on the touch sensor 11 calculated based on the output of the load detection unit 12 or the piezoelectric element 17 satisfies the standard (for example, 1 N) to provide the tactile sensation and, when the load satisfies the standard, the tactile sensation providing unit 13 or the piezoelectric element 17 is driven by the predetermined drive signal to vibrate the touch face 11a, such that the tactile sensation is stimulated. Thereby, the click sensation is provided to the operator such that the operator recognizes that an input operation is completed. Accordingly, even by the button switch such as the push-button switch (push-type button switch) which is graphically depicted on the touch sensor 11, the operator carries out the input operation to the touch sensor 11 feeling the realistic click sensation similar to that obtained when operating the push-button switch. Thus, the operator may not have the feeling of strangeness. Moreover, since the operator carries out the input operation in conjunction with perception to "have pressed" the touch sensor 11, erroneous inputs caused by mere pressing are prevented.

The standard of the pressure load to provide the tactile sensation may be appropriately set in accordance with a load characteristic of an intended push-button switch in pressing. For example, the standard may be set to be equal to a load at which the touch sensor 11 responds to the touch input (synchronizing a timing to provide the tactile sensation with a timing of response to the touch input by the touch sensor 11) or to be higher than the load at which the touch sensor 11 responds to the touch input (setting the timing to provide the tactile sensation later than the timing of response to the touch input by the touch sensor 11). For example, when the tactile sensation providing apparatus according to the present embodiment is applied to a mobile terminal, it is preferable to set the standard equal to or higher than the load at which the touch sensor 11 responds to the touch input (setting the timing to provide the tactile sensation later than the timing of response to the touch input by the touch sensor 11). Or, the users set the standard as desired, such that an elder user may set it heavier (slower) and a young user may set it lighter (quicker).

In addition, for example, the numbers of tactile sensation providing units 13, load detection units 12 and piezoelectric elements 17 are not limited to the numbers set forth in the embodiments but may take any number. For example, the number of piezoelectric elements 17 is not limited to three but may take any number. Further, the piezoelectric element 17 may have a known configuration such as monomorph, unimorph, bimorph and a laminated type, based on a size, vibration amplitude and the like of the touch sensor 11.

The present disclosure is effectively applicable also to a tactile sensation providing apparatus in which the touch sensor 11 serves as a touch switch for on/off operations. Also, the tactile sensation providing apparatus according to the present disclosure is capable of providing feelings of a multistep switch, such as a two-step switch (pressed further after pressed), by sequentially providing the tactile sensation on different standards (loads) while the touch sensor 11 is being pressed. Thereby, if the input apparatus is applied to a release button of a camera, for example, a feeling of lock focus (first step) and a feeling of release (second step) are provided. In addition, in combination with the display unit 14, the input apparatus changes a display of a menu level screen and the like in a variety of manners in accordance with the steps of pressing. Moreover, when providing the feelings of the multistep switch as described above, the drive signal to vibrate the touch face is changed at each step in order to provide a different tactile sensation at each step.

According to the present disclosure, the tactile sensation providing apparatus drives the tactile sensation providing unit 13 or the piezoelectric unit 17 when the pressure load detected based on the output of the load detection unit 12 or the piezoelectric element 17 satisfies the standard to provide the tactile sensation. Here, "when the pressure load detected based on the output of the load detection unit 12 or the piezoelectric element 17 satisfies the standard to provide the tactile sensation" may represent either "when the pressure load detected reaches a standard value to provide the tactile sensation", "when the pressure load detected exceeds the standard value to provide the tactile sensation", or "when the standard value to provide the tactile sensation is detected based on the output of the load detection unit or the piezoelectric element".

REFERENCE SIGNS LIST

11 touch sensor
11*a* touch face
12 load detection unit
13 tactile sensation providing unit
14 display unit
15 memory unit
16 control unit
17 piezoelectric element
21 housing
22 insulator
23 upper cover
24 insulator
31 load sensor
32 piezoelectric element

The invention claimed is:

1. A tactile sensation providing apparatus comprising:
a touch sensor configured to detect a touch input;
a load detection unit configured to detect a pressure load on a touch face of the touch sensor, the touch face having a plurality of areas, at least some of which vary in size along at least one edge of the touch face;
a tactile sensation providing unit configured to vibrate the touch face; and
a control unit configured to adjust a drive signal of the tactile sensation providing unit based on a pushed position when the pressure load detected by the load detection unit satisfies a standard, to provide, based on adjustment information set for each of the plurality of areas, a same tactile sensation to an object applying the pressure load on the touch face independent of which of the areas includes the pushed position at which the object applies the pressure load.

2. The tactile sensation providing apparatus according to claim 1, wherein
the control unit controls the tactile sensation providing unit based on the adjustment information set for each of the areas in a size corresponding to a position on the touch face such that the tactile sensation is provided by vibration with certain amplitude.

3. The tactile sensation providing apparatus according to claim 2, wherein
the areas to be set with the adjustment information are divided based on a position of the tactile sensation providing unit.

4. The tactile sensation providing apparatus according to claim 1, wherein
the control unit adjusts a voltage to be applied to the tactile sensation providing unit based on the pushed position such that the tactile sensation providing unit provides the tactile sensation by vibration with certain amplitude.

5. The tactile sensation providing apparatus according to claim 1, wherein
the control unit adjusts a phase of vibration of the tactile sensation providing unit based on the pushed position such that the tactile sensation providing unit provides the tactile sensation by vibration with certain amplitude.

6. The tactile sensation providing apparatus according to claim 1, wherein
the control unit adjusts the drive signal of the tactile sensation providing unit to provide the tactile sensation as a click sensation by vibration with certain amplitude.

7. A control method for a tactile sensation providing apparatus including
a touch sensor configured to detect a touch input,
a load detection unit configured to detect a pressure load on a touch face of the touch sensor, the touch face having a plurality of areas, at least some of which vary in size along at least one edge of the touch face, and
a tactile sensation providing unit configured to vibrate the touch face, the control method comprising
adjusting a drive signal of the tactile sensation providing unit based on a pushed position when the pressure load detected by the load detection unit satisfies a standard, to provide, based on adjustment information set for each of the plurality of areas, a same tactile sensation to an object applying the pressure load on the touch face independent of which of the areas includes the pushed position at which the object applies the pressure load.

8. A tactile sensation providing apparatus comprising:
a touch sensor configured to detect a touch input;
a piezoelectric element mounted on the touch sensor; and
a control unit configured to detect a pressure load on a touch face of the touch sensor based on an output signal of the piezoelectric element, the touch face having a plurality of areas, at least some of which vary in size along at least one edge of the touch face, and, when the pressure load detected satisfies a standard, to provide, based on adjustment information set for each of the plurality of areas, a same tactile sensation to an object applying the pressure load on the touch face independent of which of the areas includes the pushed position at which the object applies the pressure load, by adjusting a drive signal of the piezoelectric element based on a pushed position.

9. The tactile sensation providing apparatus according to claim 8, wherein
the control unit controls the piezoelectric element based on the adjustment information set for each of the areas in a size corresponding to a position on the touch face such that the tactile sensation is provided by vibration with certain amplitude.

10. The tactile sensation providing apparatus according to claim 9, wherein
the areas to be set with the adjustment information are divided based on a position of the piezoelectric element.

11. The tactile sensation providing apparatus according to claim 8, wherein the control unit adjusts a voltage to be applied to the piezoelectric element based on the pushed position such that the piezoelectric element provides the tactile sensation by vibration with certain amplitude.

12. The tactile sensation providing apparatus according to claim 8, wherein
the control unit adjusts a phase of vibration of the piezoelectric element based on the pushed position such that the piezoelectric element provides the tactile sensation by vibration with certain amplitude.

13. The tactile sensation providing apparatus according to claim 8, wherein
the control unit adjusts the drive signal of the piezoelectric element to provide the tactile sensation as a click sensation by the vibration with the certain amplitude.

14. A control method for a tactile sensation providing apparatus including
a touch sensor configured to detect a touch input, and
a piezoelectric element mounted on the touch sensor, the control method comprising detecting a pressure load on a touch face of the touch sensor based on an output signal of the piezoelectric element, the touch face having a plurality of areas, at least some of which vary in size along at least one edge of the touch face, and, when the pressure load detected satisfies a standard, to provide, based on adjustment information set for each of the plurality of areas, a same tactile sensation to an object applying the pressure load on the touch face independent of which of the areas includes the pushed position at which the object applies the pressure load, by adjusting a drive signal of the piezoelectric element based on a pushed position.

15. The tactile sensation providing apparatus according to claim 1, wherein
the control unit adjusts a parameter associated with adjustment of the drive signal corresponding to the pushed position based on the adjustment information when the pressure load detected by the load detection unit satisfies the standard, the adjustment information being indicative of relationship between positions on the touch face and values of the parameter to generate vibration with same amplitude at the respective positions.

16. The tactile sensation providing apparatus according to claim 15, wherein
the parameter is a voltage, phase, frequency, amplitude, or current of the drive signal, period during which the drive signal is applied to the tactile sensation providing unit, or time at which the drive signal is applied to the tactile sensation providing unit.

17. The tactile sensation providing apparatus according to claim 1, wherein
the control unit applies as the drive signal a triangle wave or a sine wave to the tactile sensation providing unit when a soft tactile sensation is to be provided, and applies as the drive signal a square wave to the tactile sensation providing unit when a hard tactile sensation is to be provided.

18. The tactile sensation providing apparatus according to claim 1, wherein
the control unit applies as the drive signal a sine wave or a square wave to the tactile sensation providing unit when a click sensation is to be provided.

19. The tactile sensation providing apparatus according to claim 1, wherein
when feelings of a multistep switch are to be provided, the control unit changes the drive signal at each step to provide a different tactile sensation at each step.

20. The tactile sensation providing apparatus according to claim 8, wherein
the control unit adjusts a parameter associated with adjustment of the drive signal corresponding to the pushed position based on the adjustment information when the pressure load detected satisfies the standard, the adjustment information being indicative of relationship between positions on the touch face and values of the parameter to generate vibration with same amplitude at the respective positions.

* * * * *